No. 759,565. PATENTED MAY 10, 1904.
W. SOBEY.
SEEDING MACHINE.
APPLICATION FILED DEC. 7, 1903.
NO MODEL. 2 SHEETS—SHEET 1.

Witnesses:
Fred Gerlach
Walter Schalch

Inventor:
William Sobey
By Peirce & Fisher
his Attorneys.

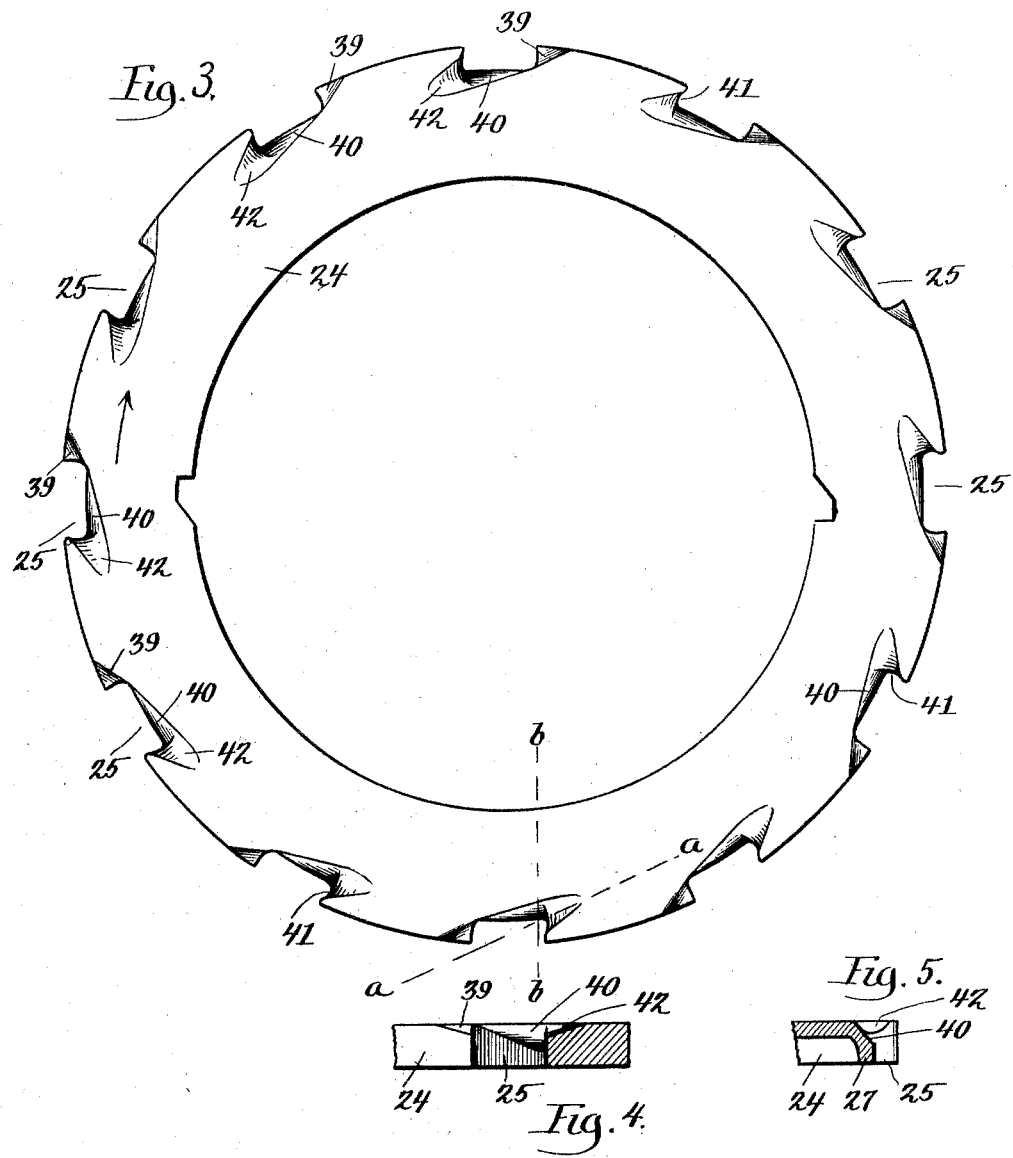

No. 759,565. Patented May 10, 1904.

UNITED STATES PATENT OFFICE.

WILLIAM SOBEY, OF RACINE, WISCONSIN, ASSIGNOR TO J. I. CASE PLOW WORKS, OF RACINE, WISCONSIN, A CORPORATION.

SEEDING-MACHINE.

SPECIFICATION forming part of Letters Patent No. 759,565, dated May 10, 1904.

Application filed December 7, 1903. Serial No. 184,030. (No model.)

*To all whom it may concern:*

Be it known that I, WILLIAM SOBEY, a citizen of the United States, and a resident of Racine, county of Racine, and State of Wisconsin, have invented certain new and useful Improvements in Seed Mechanism, of which the following is declared to be a full, clear, and exact description.

The invention relates to seed mechanism for planters of the type in which the seed-plate is designed to separate single kernels from the body of the corn in the can and deliver the same to the seed-tube one at a time. Such planters may be readily adapted for either check-row or drill planting, and provided the cells of the plate are uniformly charged the seed is planted in hills or drills with great regularity. The seed-plates of such planters are usually provided with cells adapted to receive single kernels of corn arranged lengthwise within the cells and on edge. It has been found difficult to uniformly charge the cells of the plate, and particularly so if the seed is not carefully selected and all round misshapen kernels discarded.

The present invention seeks to provide an improved construction of seed-separating mechanism by which the cells may be uniformly charged without necessitating the careful selection of the seed; and it consists in the features of construction and arrangement of parts hereinafter set forth, illustrated in the accompanying drawings, and more particularly pointed out in the appended claims.

Figure 1:
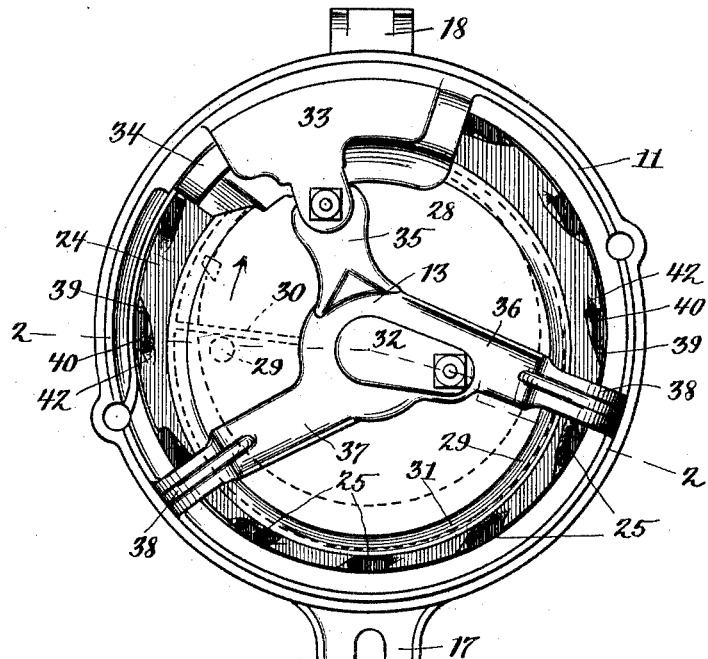
Figure 2:
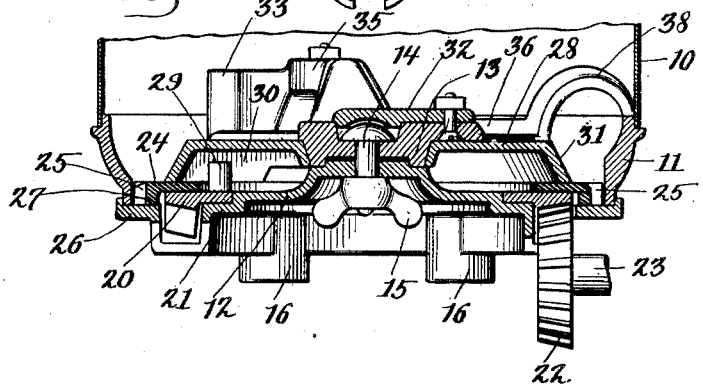

In the drawings, Figure 1 is a plan view of the seed-can and the improved seed-separating mechanism therein. Fig. 2 is a sectional view thereof on line 2 2 of Fig. 1. Fig. 3 is a plan view of the improved seed-plate. Figs. 4 and 5 are detail sections on lines *a a* and *b b*, respectively, of Fig. 3.

In Fig. 2 the lower portion of the body 10 of the seed can or hopper is shown. The bottom of the hopper comprises an annular upstanding flange 11 and a bottom plate 12, removably secured to a hub 13 by a bolt 14 and winged nut 15. The bottom plate 12 is provided with downwardly-extending leg portions 16, and flange 11 is provided at diametrically opposite points with projecting lugs 17 and 18, by which the seed-can may be secured in place upon the planter-frame.

A beveled gear-ring 20 for actuating the seed-plate revolves upon a ledge 21, formed upon the bottom plate 12, and is driven by a beveled pinion 22 on a shaft 23. The annular rotating seed-plate 24 is supported upon the outer periphery of the gear-ring 20 and is detachably connected thereto by interlocking lugs and notches in the usual manner. The seed-cells 25 are preferably formed by notches in the edge of the plate, and the seed-cells are elongated in circumferential direction, are arranged end to end in circular series, and are adapted to receive single kernels disposed lengthwise and on edge within the cells. The outer open sides of the seed-cells 25 are closed by the lower portion of the annular bottom flange 11, and the bottoms of the cells are closed by a horizontal ledge 26 upon the outer periphery of the bottom plate 12. The seed-cells 25 are preferably formed in a depending flange 27 upon the edge of the seed-plate 24, so that deep cells are provided from which the kernels cannot be easily swept by the overlying grain.

A feed-plate 28 is mounted to rotate upon the hub 13 above the seed-plate. Hub 13 is eccentrically disposed within the can-bottom, so that the feed plate or disk 28 is eccentric, as shown in Fig. 1, with reference to the seed-plate 24. The eccentric feed-plate is caused to rotate with the seed-plate and the actuating gear-ring by a pin 29 on the latter, which engages a radial depending flange 30 upon the under side of the feed-plate. The latter is provided with a downwardly-inclined or beveled flange 31, which forms the inner wall of a feed-groove above the cells 25 of the seed-plate. The outer wall of the feed-groove is formed by the upwardly-extending bottom flange 11.

In operation the eccentric feed-plate 28 moves to and from the cells in the edge of the seed-plate 24, pushes the grain toward the cells and uptilts them, so that they may fall into the cells edgewise. By means of the bolt 14 and winged nut 15 the bottom plate 12; the gear-ring 20, and the seed and feed plates 24 and 28 are removably held in place upon the bottom of the can. A small plate 32 is secured to the hub 13 and extends over the head of bolt 14, so that the latter cannot fall out when the nut 15 is unscrewed.

At or near the widest portion of the feed-groove and over the discharge-opening (not shown) is located a casing 33, within which is mounted a suitable cut-off 34. This casing is connected to the hub 13 by a piece 35. Baffles 36 and 37 also extend outwardly from the hub 13 and are connected to the upstanding bottom flange 11 by terminal arches 38.

The parts thus far described are similar to those set forth in Letters Patent of the United States, No. 736,307, issued to the J. I. Case Plow Works, assignee of myself, August 11, 1903.

To facilitate the ready entrance of the kernels to the cells 25 of the seed-plate of both regular and irregular or round kernels and to insure the uniform charging of the cells with single kernels as they pass under the cut-off, the improved seed-plate is peculiarly formed, as indicated more clearly in Figs. 3, 4, and 5.

The seed-plate rotates in the direction of the arrows in Figs. 1 and 3. The end of the seed-cells which first passes under the cut-off is termed the "leading" end of the cell and the other the "rear" end. The outer leading corner of each cell is chamfered or cut away to form a bevel 39, slightly inclined to the upper horizontal surface of the plate and leading outwardly and downwardly into the cell. The upper edge of the side wall of each cell is cut away to form a taper bevel 40, leading from the forward end of the cell and extending inwardly and downwardly toward the rear end of the cell. As clearly indicated in the drawings, the bevel 40 is quite steep—that is to say, considerably inclined to the upper horizontal surface of the plate. Moreover, incline or bevel 40 is of considerable width at the rear end of the cell and at this point extends nearly to the bottom thereof; but the inclined portion tapers upwardly and outwardly toward the leading end of the cell. The rear inner corner of each cell is somewhat rounded out, as at 41, so that the kernel may be securely retained thereby in the cell as it is pushed along under the cut-off to the discharge-opening. From this rear inner corner of each cell a shallow incline groove 42 leads upward and inwardly past the rear outer corner of the cell. It will be observed that the inner edge of the bevels 39 and 40 and of the groove 42 are substantially in line, but that the groove 42 does not extend so far down into the cell as the steep incline or bevel 40. In operation the inclines or bevel 39 and 40, particularly the bevel 39, formed by cutting away the leading outer corner of the cell, facilitate the charging of the cells with kernels. The cut-away portion or bevel 40 enlarge the cell sufficiently, so that round or otherwise irregularly-shaped kernels may enter the cells; but this cut-away portion tapers toward the forward end of the cell, so that the cell is not sufficiently large to admit two small kernels. If, however, two small kernels should enter the cell, the cut-off will engage the upper one and push it up the groove 42 out of the cell before the discharge-opening is reached. The groove 42 extends only a short distance below the top of the cell and does not extend to the outer rear corner thereof, so that a single kernel lodged in the cell could not be scraped out through the groove 42 by the cut-off or by the overlying grain. The cut-away portion or incline 40, enlarged at the rear end of the cell, as stated, permits round kernels to enter the cells, so as to be engaged by the rear end and carried around under the cut-off to the discharge-opening.

The edges of the incline or bevel 40 and chamfer or bevel 39 may be somewhat rounded, if desired, instead of being sharp, as shown in the drawings, and in other respects the precise form shown should be varied without departure from the essentials of the invention.

Having described my invention, what I claim as new, and desire to secure by Letters Patent, is—

1. In corn-planters, a rotary seed-plate, a series of elongated single-kernel cells therein arranged end to end in circular series and adapted to receive the kernels on edge, each of said cells having the upper edges of its inner side wall cut away to form a taper bevel extending from the leading end of the cell and increasing in width toward the rear end thereof, substantially as described.

2. In corn-planters, a rotary seed-plate, a series of elongated single-kernel cells therein arranged end to end in circular series and adapted to receive the kernels on edge, each of said cells having the upper edges of its inner side wall cut away to form a taper bevel extending from the leading end of the cell and increasing in width toward the rear end thereof, a shallow, inclined groove leading from the rear, inner corner of each of said cells, and the leading outer corner thereof being chamfered.

3. In planters, a rotary seed-plate notched at its edge to form a series of elongated seed-cells arranged end to end in circular series, the side wall of each of said cells being cut away to permit the entrance of irregularly-shaped kernels, said cut-away portion extending nearly to the bottom of the cell at the rear end thereof and tapering upwardly and outwardly toward the leading end.

4. In planters, a rotary seed-plate notched at its edge to form a series of elongated seed-cells arranged end to end in circular series, each of said cells having its side wall cut away to form an incline leading into the cell, the leading, outer corner of each cell being chamfered and an inclined groove leading from the inner, rear corner of each cell.

5. In planters, a rotary seed-plate notched at its edge to form a series of elongated seed-cells arranged end to end in circular series, each of said cells having its side wall cut away to form an incline leading into the cell, said incline extending nearly to the bottom of the cell at the rear end thereof and tapering upwardly and outwardly toward the leading end and a shallow, inclined groove leading from the rear, inner corner of the cell.

6. In planters, a rotary seed-plate notched at its edge to form a series of elongated seed-cells arranged end to end in circular series, each of said cells having its side wall cut away to form an incline leading into the cell, said incline being of greatest width at or near the rear end of the cell and tapering upwardly and outwardly toward the leading end thereof, the leading, outer corner of each cell being chamfered and a shallow, inclined groove leading from the rear, inner corner of each cell.

WILLIAM SOBEY.

Witnesses:
GEORGE HENRY BOLTON,
CHARLES ARMSTRONG.